(12) United States Patent
Lee et al.

(10) Patent No.: US 10,256,033 B2
(45) Date of Patent: Apr. 9, 2019

(54) INSULATION BOBBIN AND WINDING PRODUCTS

(71) Applicants: LITE-ON ELECTRONICS (GUANGZHOU) LIMITED, Guangzhou (CN); Lite-On Technology Corporation, Taipei (TW)

(72) Inventors: Yi-Hsun Lee, Taipei (TW); Chun-Lung Ho, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 411 days.

(21) Appl. No.: 15/298,230

(22) Filed: Oct. 20, 2016

(65) Prior Publication Data

US 2018/0061559 A1 Mar. 1, 2018

(30) Foreign Application Priority Data

Aug. 29, 2016 (CN) .......................... 2016 1 0750017

(51) Int. Cl.
*H02K 3/32* (2006.01)
*H02K 3/34* (2006.01)
(Continued)

(52) U.S. Cl.
CPC ............ *H01F 27/325* (2013.01); *H02K 1/14* (2013.01); *H02K 1/148* (2013.01); *H02K 3/18* (2013.01); *H02K 3/325* (2013.01); *H02K 3/345* (2013.01)

(58) Field of Classification Search
CPC .... H02K 2203/12; H02K 3/325; H02K 3/345; H01F 27/325
(Continued)

(56) References Cited

U.S. PATENT DOCUMENTS

| 6,870,292 | B2 * | 3/2005 | Owada | ...................... H02K 3/24 310/194 |
| 7,126,246 | B2 * | 10/2006 | Izumi | ...................... H02K 3/18 310/208 |

(Continued)

FOREIGN PATENT DOCUMENTS

TW M422144 2/2012

OTHER PUBLICATIONS

"Office Action of Taiwan Counterpart Application," dated Apr. 18, 2017, p. 1-p. 7, in which the listed reference was cited.

*Primary Examiner* — Jeremy A Luks
(74) *Attorney, Agent, or Firm* — JCIPRNET (57) ABSTRACT

An insulation bobbin includes a winding portion, an outer stopper portion and an inner stopper portion. The winding portion includes a body and two sidewalls respectively and perpendicularly connected to two first sides of the body. A length of a first side edge of each of the sidewalls is greater than a length of a second side edge, and a connecting edge of each of the sidewalls connects a first bottom edge and the second side edge. The outer stopper portion connects one of the second sides of the body and the first side edge of each of the sidewalls. The inner stopper portion connects the other one of the second sides of the body and the second side edge of each of the sidewalls. There is a height difference between the first bottom edge of each of the sidewalls and a second bottom edge of the inner stopper portion.

10 Claims, 6 Drawing Sheets

(51) Int. Cl.
*H01F 27/32* (2006.01)
*H02K 1/14* (2006.01)
*H02K 3/18* (2006.01)

(58) Field of Classification Search
USPC .................................................. 310/195–208
See application file for complete search history.

(56) References Cited

U.S. PATENT DOCUMENTS

| | | | | |
|---|---|---|---|---|
| 7,608,959 B2* | 10/2009 | Kataoka | ................ | H02K 1/185 |
| | | | | 310/194 |
| 7,626,304 B2* | 12/2009 | Morioka | ................ | H02K 3/325 |
| | | | | 29/609 |
| 7,649,295 B2* | 1/2010 | Fukui | .................... | H02K 3/522 |
| | | | | 310/215 |
| 8,035,268 B2* | 10/2011 | Okuyama | ............. | H02K 3/522 |
| | | | | 310/214 |
| 8,222,790 B2* | 7/2012 | Sakata | ................. | F04C 11/008 |
| | | | | 310/214 |
| 8,497,618 B2* | 7/2013 | Kato | ...................... | H02K 3/522 |
| | | | | 310/194 |
| 8,610,328 B2* | 12/2013 | Yoshida | ................ | H02K 3/522 |
| | | | | 310/194 |
| 8,643,278 B2* | 2/2014 | Chiang | ................ | H01F 27/306 |
| | | | | 315/70 |
| 8,661,651 B2* | 3/2014 | Tsuiki | ................... | H02K 3/522 |
| | | | | 29/596 |
| 8,853,910 B2* | 10/2014 | Sato | ......................... | H02K 3/24 |
| | | | | 310/179 |
| 8,875,381 B2* | 11/2014 | Uchiumi | ............ | H02K 15/0081 |
| | | | | 29/596 |
| 9,350,267 B2* | 5/2016 | Ito | ........................... | H01F 27/06 |
| 9,490,675 B2* | 11/2016 | Kim | ....................... | H02K 3/34 |
| 9,601,960 B2* | 3/2017 | Hino | ..................... | H02K 3/325 |
| 9,768,657 B2* | 9/2017 | Ogawa | .................. | H02K 3/487 |
| 9,893,594 B2* | 2/2018 | Yoshida | ................ | H02K 3/522 |
| 9,973,052 B2* | 5/2018 | Kim | ....................... | H02K 3/34 |
| 2004/0108782 A1* | 6/2004 | Enomto | .................. | H02K 1/02 |
| | | | | 310/156.43 |
| 2011/0273053 A1* | 11/2011 | Oka | ........................ | H02K 3/345 |
| | | | | 310/215 |
| 2012/0080976 A1* | 4/2012 | Oka | ........................ | H02K 3/325 |
| | | | | 310/215 |
| 2014/0230238 A1* | 8/2014 | Ueno | ....................... | H01F 37/00 |
| | | | | 29/602.1 |
| 2015/0028715 A1* | 1/2015 | Tsuiki | ................... | H02K 3/522 |
| | | | | 310/208 |
| 2016/0043604 A1* | 2/2016 | Yoshida | ................ | H02K 3/325 |
| | | | | 310/71 |
| 2016/0111933 A1* | 4/2016 | Takimoto | .............. | H02K 1/148 |
| | | | | 310/43 |
| 2017/0358965 A1* | 12/2017 | Pithwa | .................. | H02K 1/148 |
| 2018/0006511 A1* | 1/2018 | Kong | ...................... | H02K 1/16 |

* cited by examiner

INSULATION BOBBIN AND WINDING PRODUCTS

CROSS-REFERENCE TO RELATED APPLICATION

This application claims the priority benefit of China application no. 201610750017.8, filed on Aug. 29, 2016. The entirety of the above-mentioned patent application is hereby incorporated by reference herein and made a part of this specification.

BACKGROUND OF THE INVENTION

Field of the Invention

The invention relates to an insulation bobbin and a winding product, and more specifically relates to an insulation bobbin used to avoid short circuit and a winding product that the insulation bobbin is applied to.

Description of Related Art

The method for manufacturing a stator of a motor generally includes following steps: firstly, a plurality of silicon steel plates are formed by stamping method; next, an upper insulation bobbin and a lower insulation bobbin are respectively sleeved on the upper and lower ends of each of silicon steel plates; finally, a wire is wound around the upper insulation bobbin, the silicon steel plate, and the lower insulation bobbin, so as to completely manufacture the stator of the motor.

However, since the accommodating portions of the insulation bobbins for accommodating the silicon steel plate have a constant depth, the frictional resistance between the insulation bobbin and the silicon steel plate when the insulation bobbin is sleeved on the silicon steel plate is large, which results in difficulty in assembling and increases working time. In addition, since the silicon steel plate has a higher stiffness than the insulation bobbin, the insulation bobbins are easily damaged or cracked when the insulation bobbins are assembled on the silicon steel plate, thereby increasing production cost.

SUMMARY OF THE INVENTION

The invention provides an insulation bobbin in order to improve assembling efficiency.

The invention further provides a winding product having the insulation bobbin, so as to reduce damage rate in assembly process.

The insulation bobbin of the invention includes a winding portion, an outer stopper portion and an inner stopper portion. The winding portion includes a body and two sidewalls. The body has two first sides opposite each other and two second sides opposite each other. Each of the sidewalls has a first bottom edge and a connecting edge and further has a first side edge and a second side edge opposite each other. The sidewalls are respectively and perpendicularly connected to the first sides of the body. The length of the first side edge of each of the sidewalls is greater than the length of the second side edge, and the connecting edge of each of the sidewalls connects the first bottom edge with the second side edge. The outer stopper portion is connected to one of the second sides of the body and the first side edge of each of the sidewalls. The inner stopper portion is connected to another one of the second sides of the body and the second side edge of each of the sidewalls. The first bottom edge of each of the sidewalls and a second bottom edge of the inner stopper portion have a height difference therebetween.

In one embodiment of the invention, the connecting edge of each of the sidewalls includes a curved edge or an inclined edge.

In one embodiment of the invention, each of the connecting edges and the second bottom edge of the inner stopper portion are smoothly connected to each other to form a continuous curved edge, a continuous inclined edge, a discontinuous curved edge, or a discontinuous inclined edge.

In one embodiment of the invention, the outer stopper portion has a third bottom edge, the third bottom edge and the first bottom edge are located on the same plane, and the third bottom edge is perpendicular to the first bottom edge.

In one embodiment of the invention, the outer stopper portion, the inner stopper portion, and the winding portion define a winding space.

The winding product of the invention includes a silicon steel plate, two insulation bobbins, and a wire. The silicon steel plate has a first end and a second end opposite each other. The insulation bobbins are respectively sleeved on the first end and the second end of the silicon steel plate. Each of the insulation bobbins includes a winding portion, an outer stopper portion, and an inner stopper portion. The winding portion includes a body and two sidewalls. The body has two first sides opposite each other and two second sides opposite each other. Each of the sidewalls has a first bottom edge and a connecting edge and further has a first side edge and a second side edge opposite each other. The sidewalls are respectively and perpendicularly connected to the first sides of the body. The length of the first side edge of each of the sidewalls is greater than the length of the second side edge, and the connecting edge of each of the sidewalls connects the first bottom edge with the second side edge. The outer stopper portion is connected to one of the second sides of the body and the first side edge of each of the sidewalls. The inner stopper portion is connected to another one of the second sides of the body and the second side edge of each of the sidewalls. The first bottom edge of each of the sidewalls and a second bottom edge of the inner stopper portion have a height difference therebetween. The wire is wound from the winding portion of one of the insulation bobbins over the silicon steel plate to the winding portion of another one of the insulation bobbins.

In one embodiment of the invention, the connecting edge of each of the sidewalls includes a curved edge or an inclined edge.

In one embodiment of the invention, each of the connecting edges and the second bottom edge of the inner stopper portion are smoothly connected to each other to form a continuous curved edge, a continuous inclined edge, a discontinuous curved edge, or a discontinuous inclined edge.

In one embodiment of the invention, the outer stopper portion has a third bottom edge, the third bottom edge and the first bottom edge are located on the same plane, and the third bottom edge is perpendicular to the first bottom edge.

In one embodiment of the invention, the outer stopper portion, the inner stopper portion, and the winding portion define a winding space.

Based on the above, in the design of the insulation bobbin of the invention, the length of the first side edge of each of the sidewalls of the winding portion is greater than the length of the second side edge, the connecting edge of each of the sidewalls connects the first bottom edge with the second bottom edge, and the first bottom edge of each of the sidewalls and the second bottom edge of the inner stopper portion have a height difference therebetween. Therefore, a cut-off corner shape is formed between the sidewall of the winding portion and the inner stopper portion. When the insulation bobbin is sleeved on the silicon steel plate, the frictional resistance is reduced because of the cut-off corner design of the insulation bobbin, so the assembly process is facilitated and the assembling efficiency is increased. In addition, because of the cut-off corner design of the insulation bobbin, the damage rate when the insulation bobbin is sleeved on the silicon steel plate is effectively reduced, thereby reducing material cost compared to the conventional manufacturing method. Hence, the damage rate in assembly process of the winding product of the invention is reduced.

Several exemplary embodiments accompanied with figures are described in detail below to further describe the invention in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the invention.

DESCRIPTION OF THE EMBODIMENTS

Figure 1A:
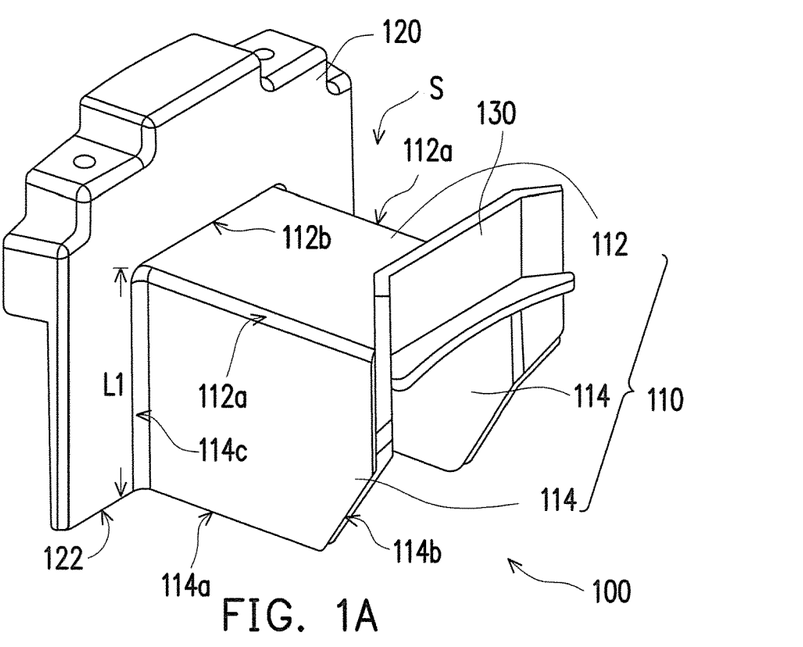
FIG. 1A is a schematic view depicting an insulation bobbin in one embodiment of the invention.
Figure 1B:
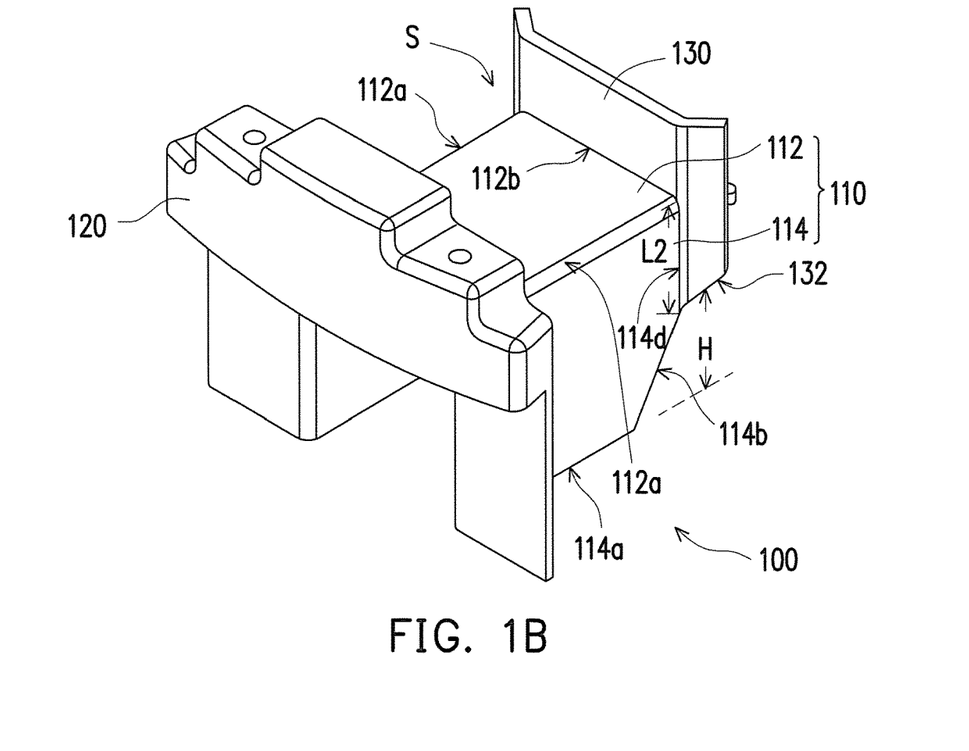
FIG. 1B is a schematic view depicting the insulation bobbin in FIG. 1A at another angle.

FIG. 1A is a schematic view depicting an insulation bobbin in one embodiment of the invention. FIG. 1B is a schematic view depicting the insulation bobbin in FIG. 1A at another angle. Referring to FIGS. 1A and 1B, in the present embodiment, an insulation bobbin 100 includes a winding portion 110, an outer stopper portion 120, and an inner stopper portion 130. The winding portion 110 includes a body 112 and two sidewalls 114. The body 112 has two first sides 112a opposite each other and two second sides 112b opposite each other. Each of the sidewalls 114 has a first bottom edge 114a and a connecting edge 114b and further has a first side edge 114c and a second side edge 114d opposite each other. The sidewalls 114 are respectively and perpendicularly connected to the first sides 112a of the body 112. The length L1 of the first side edge 114c of each of the sidewalls 114 is greater than the length L2 of the second side edge 114d, and the connecting edge 114b of each of the sidewalls 114 connects the first bottom edge 114a with the second side edge 114d. The outer stopper portion 120 is connected to one of the second sides 112b of the body 112 and the first side edge 114c of each of the sidewalls 114. The inner stopper portion 130 is connected to another one of the second sides 112b of the body 112 and the second side edge 114d of each of the sidewalls 114. The first bottom edge 114a of each of the sidewalls 114 and a second bottom edge 132 of the inner stopper portion 130 have a height difference H therebetween.

Figure 1C:
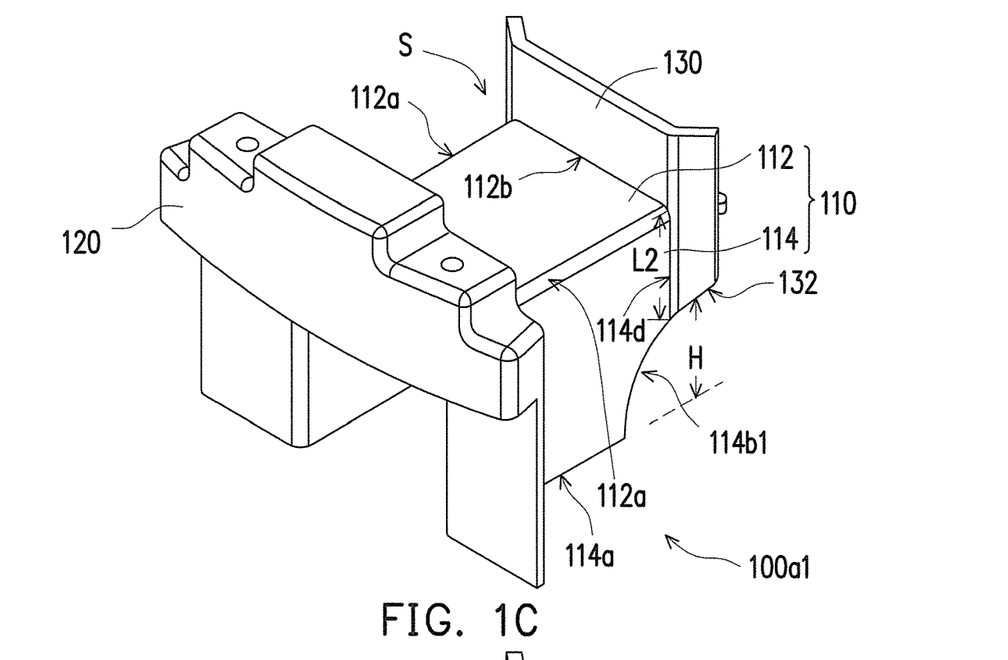
FIG. 1C to FIG. 1F are schematic views depicting an insulation bobbin in a plurality of embodiments of the invention.

To be more specific, the insulation bobbin 100 of the present embodiment is embodied as an integrally formed structure, for example, the winding portion 110, the outer stopper portion 120, and the inner stopper portion 130 are integrally formed. In addition, the height of each of the outer stopper portion 120 and the inner stopper portion 130 is greater than the height of the winding portion 110. Therefore, the outer stopper portion 120, the inner stopper portion 130, and the winding portion 110 define a winding space S. Specifically, the connecting edge 114b of each of the sidewalls 114 of the winding portion 110 is embodied as an inclined edge. Certainly, in other embodiments such as an embodiment in FIG. 1C, the connecting edge 114b1 of the insulation bobbin 100a1 can also be a curved edge, which are not limited by the invention. In other words, the second side edge 114d each of the sidewalls 114 is not directly connected with the first bottom edge 114a and is connected with the first bottom edge 114a through the connecting edge 114b. Because of the design of the connecting edge 114b, the length L1 of the first side edge 114c of each of the sidewalls 114 in the present embodiment is different from the length L2 of the second side edge 114d. Namely, the length L1 of the first side edge 114c is greater than the length L2 of the second side edge 114d. As a result, the first side edge 114c and the second side edge 114d of the winding portion 110 are not located on the same plane.

Figure 1D:
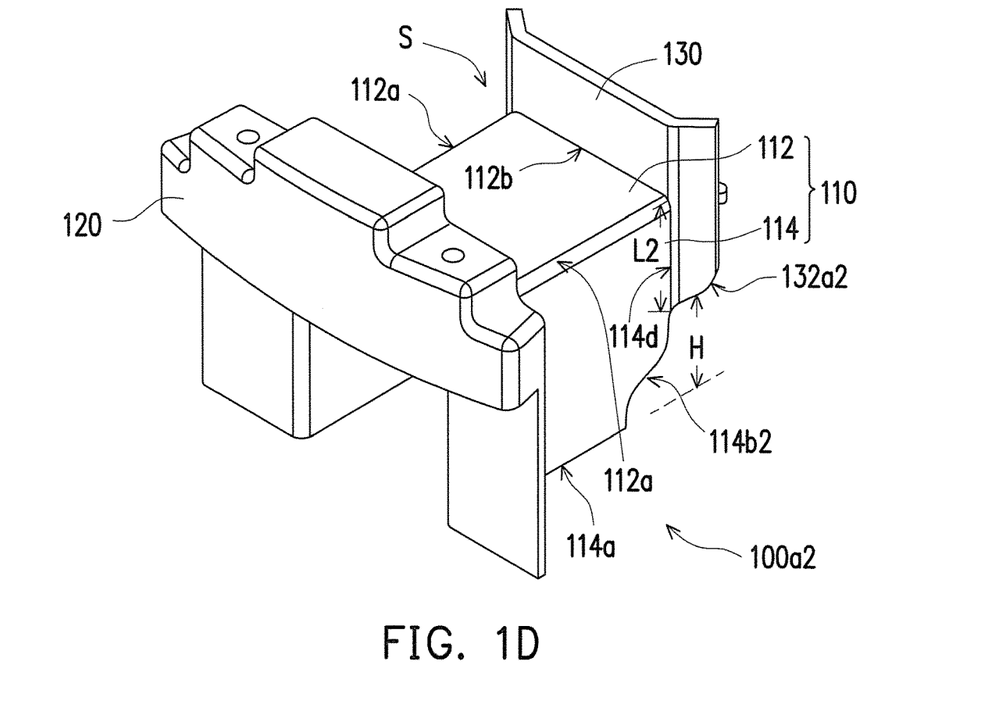
Figure 1E:
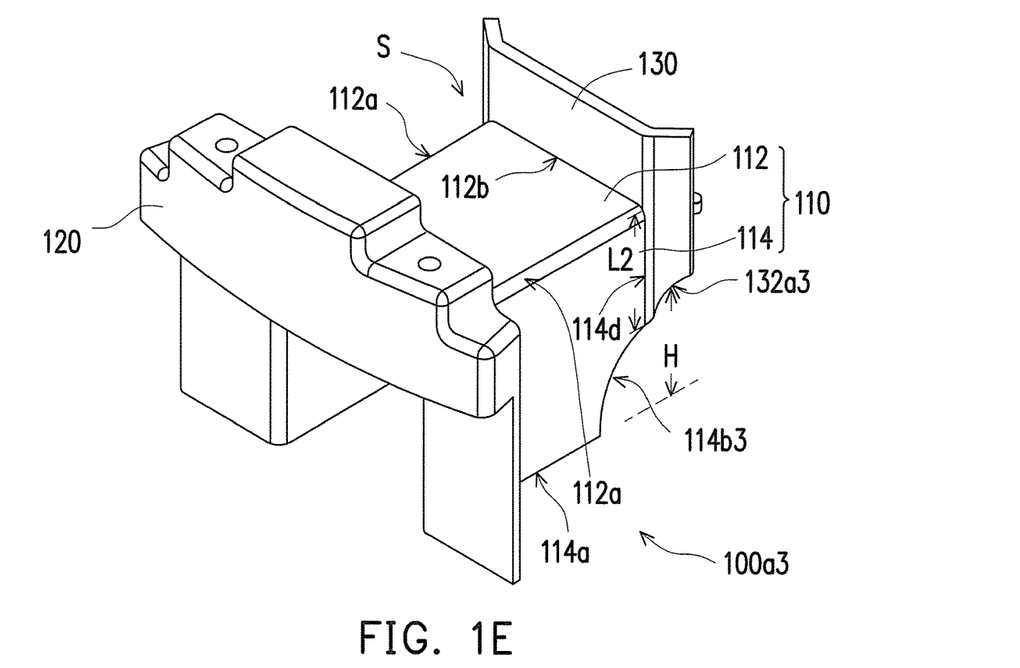
Figure 1F:
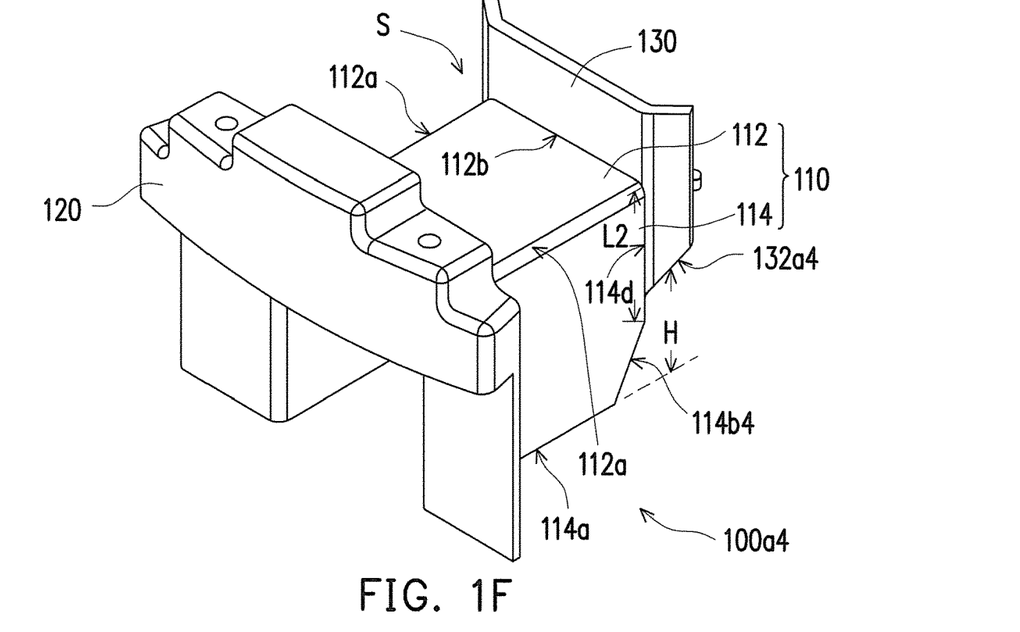

Furthermore, as shown in FIG. 1B, each of the connecting edges 114b and one of the second bottom edges 132 of the inner stopper portion 130 are smoothly connected to each other to form a continuous inclined edge. In other words, the second bottom edge 132 of the inner stopper portion 130 is also an inclined edge and is not a horizontal line parallel to a horizontal plane. It should be noted here, in the present embodiment, a continuous inclined edge is formed by using cutting tools to cut from the inner stopper portion 130 to the sidewall 114 of the winding portion 110. Certainly, because of the differences in the manufacturing process, in other embodiments such as the embodiment in FIG. 1D, each of the connecting edges 114b2 of the insulation bobbin 100a2 and one of the second bottom edges 132a2 are smoothly connected to each other to form a continuous curved edge. In another embodiment, such as the embodiment in FIG. 1E, each of the connecting edges 114b3 of the insulation bobbin 100a3 and one of the second bottom edges 132a3 are smoothly connected to each other to form a discontinuous curved edge. In yet another embodiment, such as the embodiment in FIG. 1F, each of the connecting edges 114b4 of the insulation bobbin 100a4 and one of the second bottom edges 132a4 are smoothly connected to each other to form a discontinuous inclined edge, which are not limited by the invention. At this time, the first bottom edge 114a of each of the sidewalls 114 of the winding portion 110 and the second bottom edge 132 of the inner stopper portion 130 have the height difference H therebetween. In other words, the winding portion 110 of the insulation bobbin 100 and the inner stopper portion 130 are not designed to have the same depth, and a cut-off corner shape is formed between each of the sidewalls 114 of the winding portion 110 and the inner stopper portion 130.

On the other hand, referring to FIG. 1A, the outer stopper portion 120 of the present embodiment has a third bottom edge 122, the third bottom edge 122 and the first bottom edge 114a are located on the same plane, and the third bottom edge 122 is perpendicular to the first bottom edge 114a. In other words, the winding portion 110 of the insulation bobbin 100 and the outer stopper portion 120 are designed to have the same depth, and substantially, the outer stopper portion 120 and each of the sidewalls 114 of the winding portion 110 are perpendicularly connected to each other and are not designed to have a cut-off corner shape therebetween.

In the design of the insulation bobbin 100 of the present embodiment, the length L1 of the first side edge 114c of each of the sidewalls 114 of the winding portion 110 is greater than the length L2 of the second side edge 114d, the connecting edge 114b of each of the sidewalls 114 connects the first bottom edge 114a with the second bottom edge 114d, and the first bottom edge 114a of each of the sidewalls 114 and the second bottom edge 132 of the inner stopper portion 130 have the height difference H therebetween. Therefore, the winding portion 110 of the insulation bobbin 100, the outer stopper portion 120, and the inner stopper portion 130 are not designed to have the same depth, and the cut-off corner shape may be formed between each of the sidewalls 114 of the winding portion 110 and the inner stopper portion 130. In the following process, when the insulation bobbin 100 is sleeved on a silicon steel plate (not shown), the frictional resistance is reduced because of the cut-off corner design of the insulation bobbin 100, so the assembly process is facilitated and the assembling efficiency is increased.

It should be noted, the embodiments below utilize component labels and partial content from the aforementioned embodiments, wherein identical or similar elements are labeled with identical labels, and therefore description of similar technical content will be omitted. Regarding the description of the omitted parts, reference may be made to the previous embodiment, and will not be repeated in the below embodiment.

Figure 2A:
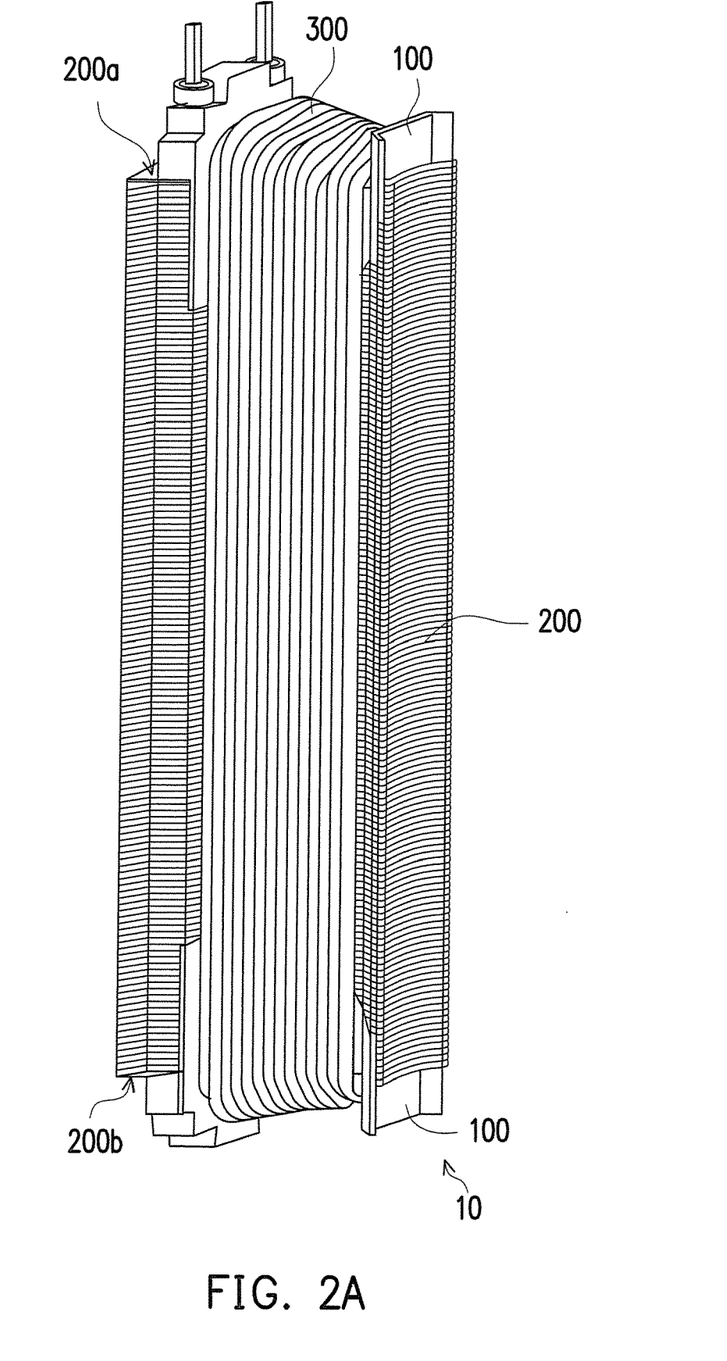
FIG. 2A is a schematic view depicting a winding product in one embodiment of the invention.
Figure 2B:
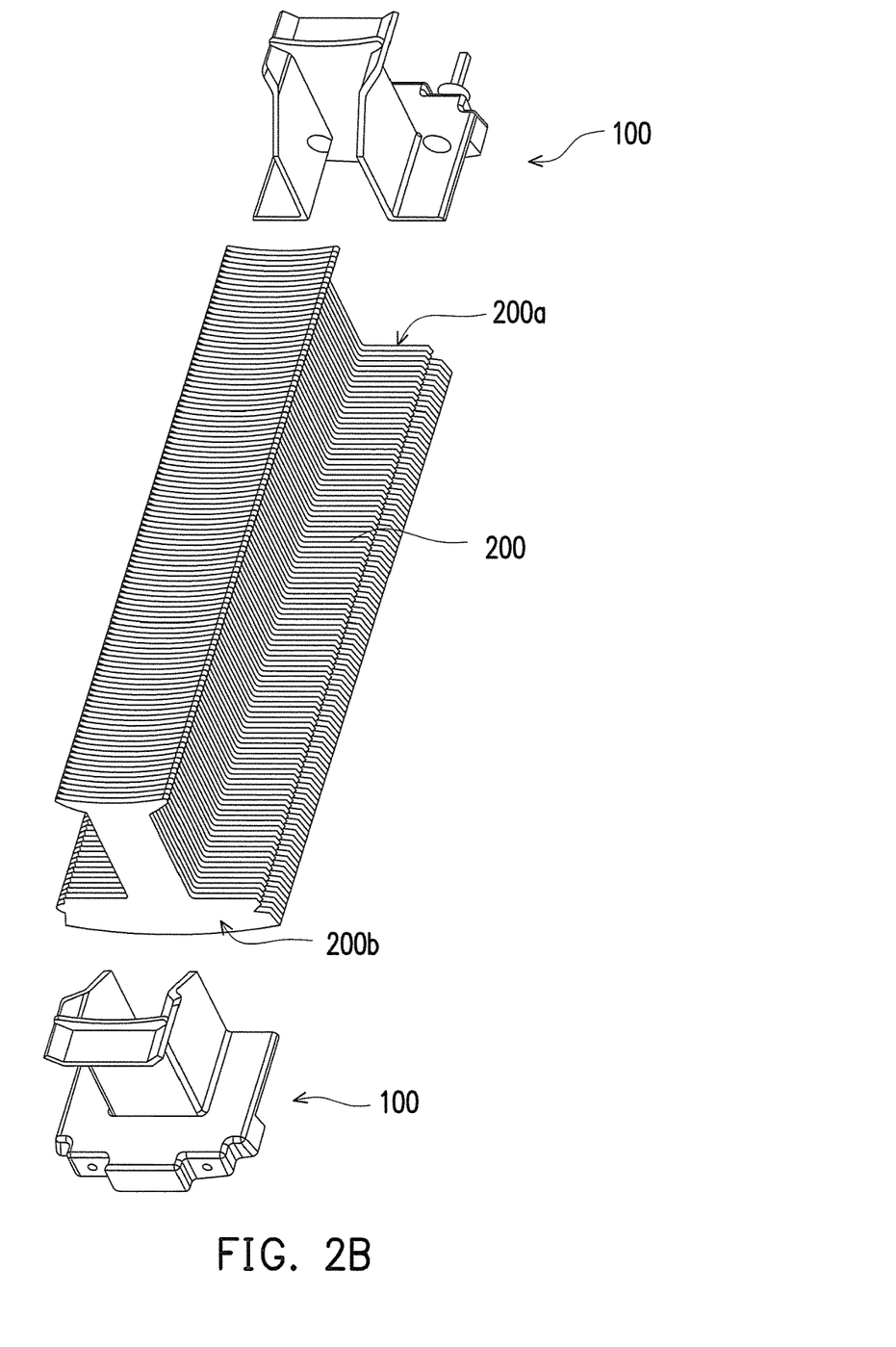
FIG. 2B to FIG. 2C are exploded and assembled views depicting the winding product in FIG. 2A.
Figure 2C:
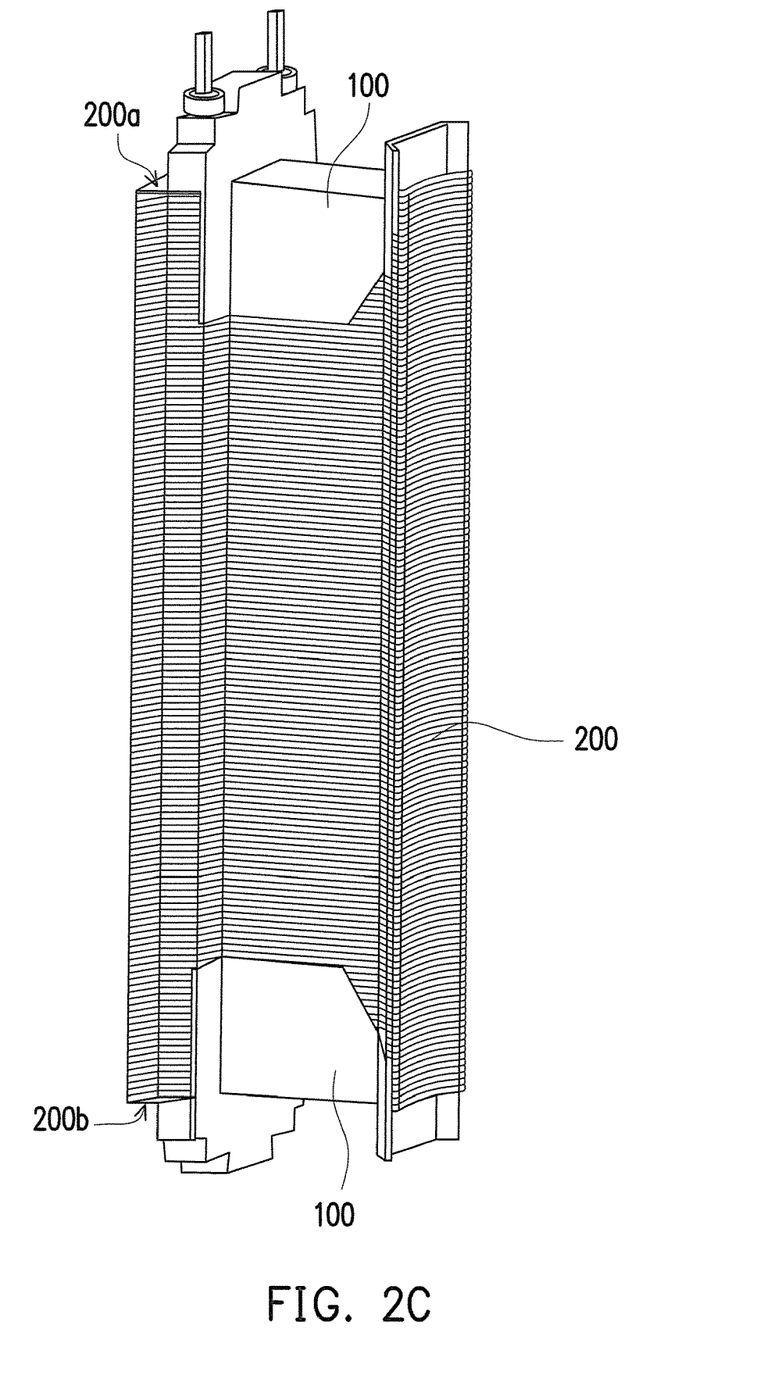

FIG. 2A is a schematic view depicting a winding product in one embodiment of the invention. FIG. 2B to FIG. 2C are exploded and assembled views depicting the winding product in FIG. 2A. Referring to FIG. 2A, FIG. 2B, and FIG. 2C, in the present embodiment, the winding product 10 includes two insulation bobbins 100 as aforementioned, a silicon steel plate 200, and a wire 300. The silicon steel plate 200 has a first end 200a and a second end 200b opposite each other. The insulation bobbins 100 are respectively sleeved on the first end 200a and the second end 200b of the silicon steel plate 200. The wire 300 is wound from the winding portion 110 of one of the insulation bobbins 100 over the silicon steel plate 200 to the winding portion 110 of another one of the insulation bobbins 100.

Since the insulation bobbin 100 is designed to have a cut-off corner shape, the damage rate when the insulation bobbins 100 are directly sleeved on the first end 200a and the second end 200b of the silicon steel plate 200 from above and below is effectively reduced, thereby reducing material cost compared to the conventional manufacturing method. Hence, the damage rate in assembly process of the winding product 10 of the present embodiment is reduced. In addition, the insulation bobbins 100 sleeved on the silicon steel plate 200 can effectively prevent short-circuit happening between the wire 300 and the silicon steel plate 200 because of friction.

In summary, in the design of the insulation bobbin of the invention, the length of the first side edge of each of the sidewalls of the winding portion is greater than the length of the second side edge, the connecting edge of each of the sidewalls connects the first bottom edge with the second bottom edge, and the first bottom edge of each of the sidewalls and the second bottom edge of the inner stopper portion have a height difference therebetween. Therefore, a cut-off corner shape is formed between the sidewall of the winding portion and the inner stopper portion. When the insulation bobbin is sleeved on the silicon steel plate, the frictional resistance is reduced because of the cut-off corner design of the insulation bobbin, so the assembly process is facilitated and the assembling efficiency is increased. In addition, because of the cut-off corner design of the insulation bobbin, the damage rate when the insulation bobbin is sleeved on the silicon steel plate is effectively reduced, thereby reducing material cost compared to the conventional manufacturing method. Hence, the damage rate in assembly process of the winding product of the invention is reduced.

It will be apparent to those skilled in the art that various modifications and variations can be made to the structure of the disclosed embodiments without departing from the scope or spirit of the invention. In view of the foregoing, it is intended that the disclosure cover modifications and variations of this specification provided they fall within the scope of the following claims and their equivalents.

What is claimed is:

1. An insulation bobbin, comprising:
   a winding portion, comprising:
      a body, having two first sides opposite each other and two second sides opposite each other; and
      two sidewalls, each of the sidewalls having a first bottom edge and a connecting edge and further having a first side edge and a second side edge opposite each other, wherein the sidewalls are respectively and perpendicularly connected to the first sides of the body, a length of the first side edge of each of the sidewalls is greater than a length of the second side edge, and the connecting edge of each of the sidewalls connects the first bottom edge with the second side edge;
   an outer stopper portion, connected to one of the second sides of the body and the first side edge of each of the sidewalls;
   an inner stopper portion, connected to another one of the second sides of the body and the second side edge of each of the sidewalls, wherein the first bottom edge of each of the sidewalls and a second bottom edge of the inner stopper portion have a height difference therebetween.

2. The insulation bobbin as recited in claim 1, wherein the connecting edge of each of the sidewalls comprises a curved edge or an inclined edge.

3. The insulation bobbin as recited in claim 2, wherein each of the connecting edges and the second bottom edge of the inner stopper portion are smoothly connected to each other to form a continuous curved edge, a continuous inclined edge, a discontinuous curved edge, or a discontinuous inclined edge.

4. The insulation bobbin as recited in claim 1, wherein the outer stopper portion has a third bottom edge, the third bottom edge and the first bottom edge are located on a same plane, and the third bottom edge is perpendicular to the first bottom edge.

5. The insulation bobbin as recited in claim 1, wherein the outer stopper portion, the inner stopper portion, and the winding portion define a winding space.

6. A winding product, comprising:
   a silicon steel plate, having a first end and a second end opposite each other;
   two insulation bobbins, respectively sleeved on the first end and the second end of the silicon steel plate, each of the insulation bobbins comprising:
      a winding portion, comprising:

a body, having two first sides opposite each other and two second sides opposite each other; and two sidewalls, each of the sidewalls having a first bottom edge and a connecting edge and further having a first side edge and a second side edge opposite each other, wherein the sidewalls are respectively and perpendicularly connected to the first sides of the body, a length of the first side edge of each of the sidewalls is greater than a length of the second side edge, and the connecting edge of each of the sidewalls connects the first bottom edge with the second side edge;

an outer stopper portion, connected to one of the second sides of the body and the first side edge of each of the sidewalls; and an inner stopper portion, connected to another one of the second sides of the body and the second side edge of each of the sidewalls, wherein the first bottom edge of each of the sidewalls and a second bottom edge of the inner stopper portion have a height difference therebetween; and a wire, wound from the winding portion of one of the insulation bobbins over the silicon steel plate to the winding portion of another one of the insulation bobbins.

7. The winding product as recited in claim 6, wherein the connecting edge of each of the sidewalls comprises a curved edge or an inclined edge.

8. The winding product as recited in claim 7, wherein each of the connecting edges and the second bottom edge of the inner stopper portion are smoothly connected to each other to form a continuous curved edge, a continuous inclined edge, a discontinuous curved edge, or a discontinuous inclined edge.

9. The winding product as recited in claim 6, wherein the outer stopper portion has a third bottom edge, the third bottom edge and the first bottom edge are located on a same plane, and the third bottom edge is perpendicular to the first bottom edge.

10. The winding product as recited in claim 6, wherein the outer stopper portion, the inner stopper portion, and the winding portion define a winding space.

* * * * *